(No Model.)

J. A. COULTAUS.
WIRE COILING MACHINE.

No. 265,026. Patented Sept. 26, 1882.

WITNESSES:
C. Neveux
C. Sedgwick

INVENTOR:
J. A. Coultaus
BY Munn & Co
ATTORNEYS.

UNITED STATES PATENT OFFICE.

JOSEPH A. COULTAUS, OF BROOKLYN, NEW YORK.

WIRE-COILING MACHINE.

SPECIFICATION forming part of Letters Patent No. 265,026, dated September 26, 1882.

Application filed July 25, 1882. (No model.)

*To all whom it may concern:*

Be it known that I, JOSEPH A. COULTAUS, of Brooklyn, in the county of Kings and State of New York, have invented a new and useful Improvement in Coiling Wire, of which the following is a full, clear, and exact description.

My invention relates to an apparatus for coiling wire for making spiral wire springs, or for making coils to be used in manufacturing mattresses or for any other purpose, whereby the coils may be made more easily and rapidly than heretofore, and whereby the coils may be made in continuous lengths.

In carrying out my invention I employ two blocks of cast-iron or other suitable metal, each formed with corresponding semi-cylindrical grooves, and adapted to be bolted together upon a table, so that the grooves will form a cylindrical passage, one of the blocks being formed with an orifice in its front, intersecting the cylindrical passage at about right angles thereto, and at or near its upper side, in combination with suitable rollers placed near the orifice for forcing the wire into the orifice and cylindrical passage.

Reference is to be had to the accompanying drawings, forming part of this specification, in which similar letters of reference indicate corresponding parts in all the figures.

Figure 1:
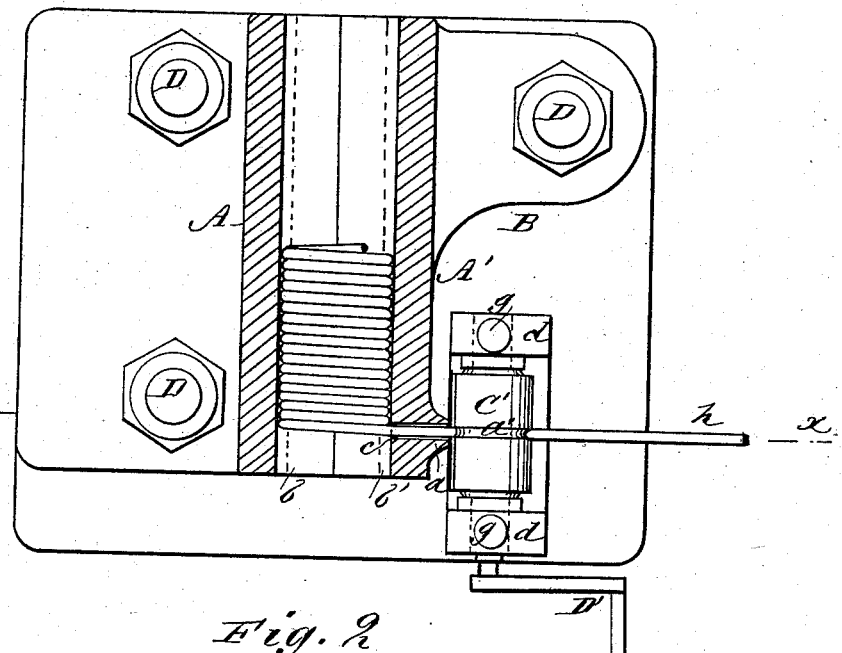
Figure 2:
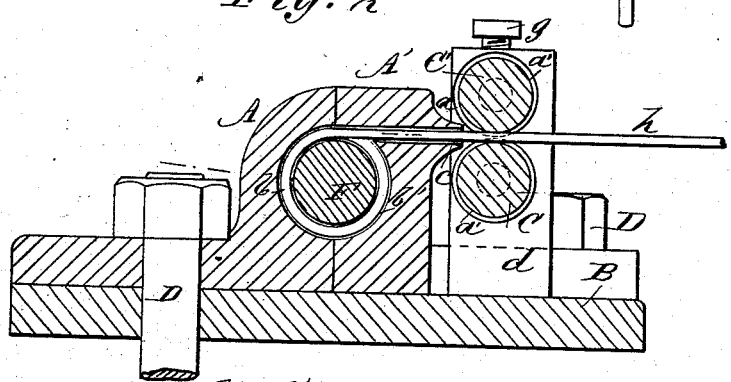
Figure 3:
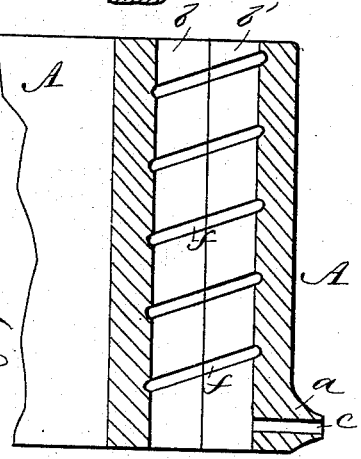
Figure 4:
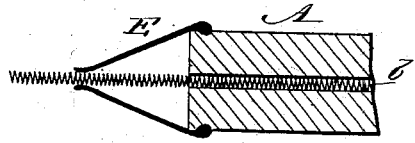

Figure 1 is a sectional plan view of my wire-coiling apparatus. Fig. 2 is a sectional elevation of the same, taken on the line *x x* of Fig. 1. Fig. 3 is a detailed sectional plan view, showing the cylindrical passage of the castings spirally grooved; and Fig. 4 is a detailed view, showing the castings provided with a rubber or similar thimble for steadying and retaining the coil as it issues from the cylindrical passage, to be used principally in coiling very small wire.

A A' represent blocks of cast-iron or other suitable metal, formed with semi-cylindrical grooves, as shown at *b*. The block A' is formed with the enlargement or projection *a*, which has an orifice formed through it, as shown at *c*. The plates are adapted to be bolted firmly together upon the table B by the bolts D D, so that the grooves *b b'* will form a cylindrical passage, as shown in Fig. 2.

C C' represent the rollers, which are grooved, as shown at *a'*, to receive the wire *h*, and are journaled in the uprights *d d* in such manner that they stand near to and on a line with the orifice *c*, as shown in Fig. 2, for giving the wire a direct thrust into the orifice. The orifice *c* is made at right angles to the groove *b'*, and is so made as to intersect the groove at or near its upper side, so that in beginning the coil the end of the wire will take the curvature of the cylindrical passage and follow it, as indicated in Figs. 1 and 2. In case the wire is to be coiled close, the grooves *b b'* will be smooth surfaces, as shown in Fig. 1; but in case the coils in the wire are to be made wide apart the surfaces of the grooves will be guttered, as shown at *f f'*, to form spiral tracks, when the castings are bolted in place, for the wire to follow, as will be understood from Fig. 3, the grooves being made to suit the pitch desired in the spring.

The upper roller, C', is journaled in bearing-blocks, which are made adjustable by means of the screws *g g*, so that this roller may be set to suit large and small wire, as desired.

In making the coil the end of the wire to be coiled is first passed between the rollers C C' and into the orifice *c*. The roller C is then revolved by the crank D', which causes the wire to be forced through the orifice into and coiled around in the cylindrical passage, as indicated in Figs. 1 and 2, the coils having an external size equal to the size of the passage. In case the walls of the passage are smooth surfaces, the wire will be tight-coiled; but in case they are spirally guttered the wire will follow the grooves, and the coils in the wire will be as wide apart as the grooves. After the end of the wire being coiled has been reached the block A will be loosened from the table B and moved back away from the block A', so that that portion of the wire remaining in the orifice may be withdrawn and the coil removed from between the blocks.

In some cases, where it is desired to make the coil very regular both inside and out, I propose to use the plain mandrel F in the cylindrical passage, of a diameter equal to the diameter of the passage less twice the diameter of the wire to be coiled, so that the wire will have to pass around it as it is forced into the passage. In this manner the wire will be held by the mandrel firmly against the wall of the cylindrical passage, and will thus be made very regular.

There will be as many blocks A A′, having grooves b b′ of different sizes, as it is desired to make coils of different sizes.

In coiling fine wire the rubber or similar thimble E will be placed upon the castings A A′, as shown in Fig. 4, to slightly retard the coil as it issues from the passage, and prevent it from tangling and bending.

Instead of using the castings A A′ for carrying my invention into effect, an open-ended metal pipe or case having an orifice in it and held stationary might be used; but the device shown and described is preferred.

Having thus described my invention, what I claim as new, and desire to secure by Letters Patent, is—

1. The apparatus herein shown and described for coiling wire, consisting of the blocks A A′, having semi-cylindrical grooves b b′, the block A′ having the orifice c, in combination with the rollers C C′, substantially as set forth.

2. In a wire-coiling apparatus, the combination, with grooved block A, of the grooved block A′, having the tangential orifice c, substantially as and for the purposes set forth.

3. The semi-cylindrically-grooved block A, having the spiral gutters f, in combination with the semi-cylindrically-grooved block A′, having the corresponding spiral gutters f′, substantially as and for the purposes set forth.

4. The combination, with the semi-cylindrically-grooved blocks A A′, of the plain mandrel F, the block A being formed with the orifice c, substantially as and for the purposes set forth.

5. The combination, with the blocks or castings A A′, of the thimble E, of rubber, substantially as and for the purposes described.

JOSEPH A. COULTAUS.

Witnesses:
 H. A. WEST,
 C. SEDGWICK.